(12) United States Patent
Okawa et al.

(10) Patent No.: US 6,226,573 B1
(45) Date of Patent: *May 1, 2001

(54) COURSE GENERATOR OF MOVING BODY

(75) Inventors: Yukio Okawa, Yokohama; Tsuguo Sudo; Kiyoshi Kaneko, both of Tokyo, all of (JP)

(73) Assignee: Komatsu Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/011,270
(22) PCT Filed: Aug. 1, 1996
(86) PCT No.: PCT/JP96/02171
  § 371 Date: Jan. 30, 1998
  § 102(e) Date: Jan. 30, 1998
(87) PCT Pub. No.: WO97/05534
  PCT Pub. Date: Feb. 13, 1997

(30) Foreign Application Priority Data
Aug. 1, 1995 (JP) .................................................... 7-196553

(51) Int. Cl.⁷ ...................................................... G06F 15/50
(52) U.S. Cl. .............................. 701/25; 701/23; 701/24; 701/26; 701/205; 701/302; 180/168; 414/279; 318/587
(58) Field of Search ................................. 701/25, 26, 23, 701/24, 122, 205, 201, 200, 300, 302; 180/168; 318/580, 587; 414/279

(56) References Cited

U.S. PATENT DOCUMENTS

| | | | |
|---|---|---|---|
| 5,155,683 | * | 10/1992 | Rahim .................................... 701/25 |
| 5,219,036 | * | 6/1993 | Schwager et al. .................... 180/168 |
| 5,281,901 | * | 1/1994 | Yardley et al. ....................... 318/587 |

* cited by examiner

Primary Examiner—William A. Cuchlinski, Jr.
Assistant Examiner—Yonel Beaulieu
(74) Attorney, Agent, or Firm—Diller, Ramik & Wight

(57) ABSTRACT

An apparatus for improving the reliability of a course generator of a moving body and the efficiency of the moving body. When the tangent (53) of a scheduled course (50) at its branch point (PS) is in parallel with a line segment (54) coincident with the traveling direction of the moving body (20) at the end point (PL) of a branch course (52), the branch course (52) is generated from a cubic curve having one extreme coincident with the branch point (PS), and the tangent of the cubic curve at this extreme coincides with the tangent (53) of the scheduled course (50) at the branch point (PS). The other extreme of the cubic curve coincides with the end point (PL) of the branch course (52), and the tangent of the curve at this extreme coincides with a line segment (54) which in turn coincides with an end point traveling direction of the moving body. A ground monitor station (40) guides and travels the moving body (20) along a modification of the branch course. When guided for traveling, the moving body (20) generates the modification of the branch traveling course. When any of the moving bodies generates the data of the modified course and transmits it to the ground monitor station (40) in this way, the ground monitor station (40) again generates the scheduled course and the branch course on the basis of the data of the modified course, and transmits the re-generated data of the course to each moving body.

3 Claims, 6 Drawing Sheets

COURSE GENERATOR OF MOVING BODY

TECHNICAL FIELD

The present invention relates to an apparatus to generate a course branching from a scheduled course of a moving body.

BACKGROUND ART

FIG. 8 shows a drawing disclosed in Japanese Patent Application Laid-open No. 5-257529.

As shown in this figure, an unmanned dump truck 20, which is a moving body, is guided along a scheduled course 50 with a known dead reckoning method.

Should the dump truck 20 then move to a prescribed standby point, this standby point is designated the starting point; an operator of a loader 60 at a loading point PL on a working face uses a radio controller to remotely operate and cause the dump truck 20 to approach the loading point PL of the loader 60. On the basis of the position and direction data of the loading point PL which was actually arrived at through such remote operation, this dump truck 20 generates a branch course CL, SL and sends the position data of this branch course to other dump trucks.

In this case, the transmission and reception of the branch course position data is effected among a plurality of dump trucks moving through a large work site.

As a result, each dump truck can be guided with the dead reckoning method on the branch course.

The conventional method for generating branch courses is generally effected with the following procedures.

Specifically, (a) A straight circuit course 51 which is roughly parallel to a working face is established in advance.

(b) A dump truck 20 is guided from a prescribed standby point to a loading point PL through radio controlled guidance; its position coordinates and azimuth are calculated and stored.

(c) The crossing point PC of an extension line 54' in the direction of the azimuth at the loading point PL with the circuit course 51 is calculated.

(d) The crossing angle φ of the extension line 54' and the circuit course (straight line) 51 at the crossing point PC is found. This crossing angle φ is limited to $45° \leq \phi \leq 135°$. When this crossing angle φ falls outside this range, the branch course is not generated.

(e) The turning radius r in accord with the crossing angle φ is determined.

(f) The point PS at which the arc CL with radius r inscribed in the two straight lines 51 and 54' is tangent to the circuit course 51 is found and designated as the stopping point. Thereby a branch course comprising the arc CL and the straight line LS is generated.

When a branch course is generated in this way, a dump truck 20, which moved from a scheduled course 50 on a circuit course 51 as shown by the arrow, stops at the stopping point PS and is guided by dead reckoning to back up to a loading point PL along a branch course comprising an arc CL and a straight line SL.

However such a method for generating a branch course presupposes that, as shown in (a) above, the working face is in a straight line and has a certain length and accordingly the circuit course 51 also is parallel to this working face and is a straight line of a certain length.

In effect, the generation of a branch course is limited by the form of the working face and the form of the scheduled course.

Also, as shown in (d) above, the crossing angle φ of the straight circuit course 51 and the extension line 54' is limited to $45° \leq \phi \leq 135°$. Therefore a branch course cannot even be generated if these line segments do not cross to begin with.

In effect, the generation of a branch course is limited by the azimuth of the dump truck 20 at the loading point PL.

Also, as shown in (f) above, it is presupposed that the stopping point PS can be established on the circuit course 51. A branch course cannot be generated when the stopping point PS cannot be established on the circuit course 51.

In effect, the generation of a branch course is limited by the azimuth and coordinate position of the loading point PL.

Before now, as noted above, the generation of a branch course was limited by the form of the working face, the form of the scheduled course, and the azimuth and coordinate position of the loading point PL and it could not be certain that a branch course would be generated.

With the foregoing facts in view, it is a first object of the present invention to provide a course generator of moving body which can for certain generate a branch course, regardless of the form of a working face, the form of a scheduled course, and the azimuth and coordinate position of a loading point PL.

As discussed above, the transmission and reception of the branch course position data is effected among a plurality of dump trucks which are moving through a large work site.

However, when an arrangement is made in such a manner, the dump truck which generated the branch course must transmit a large amount of data individually to many other dump trucks. For this reason, the working efficiency of the dump truck is decreased by the amount of time necessary for transmission processing.

Also, in the case where communication is performed randomly among dump trucks, the frequency bands of the dump trucks' transmitter/receivers must be separated in order to avoid cross talk of the communications. This increases costs of communications devices and the complexity of the operations.

Also, since transmission and reception are effected in a large work site, the communications power must be at certain level or higher on the assumption that the dump trucks are far apart. This causes difficulties legally and in terms of costs.

With the foregoing facts in view, it is a second object of the present invention to provide a course generator of moving body which can resolve the difficulties discussed above, such as poor working efficiency resulting in the case where communication is performed randomly among moving bodies.

DISCLOSURE OF THE INVENTION

As discussed above, it is a first object of the present invention to provide a course generator of a moving body which can for certain generate a branch course, regardless of the form of a working face, the form of a scheduled course, and the azimuth and coordinate position of a loading point PL.

In order to achieve the first object, the principal first invention of the present invention provides a course generator of a moving body to generate a branch course branching from a branch point on a scheduled course along which the moving body is guided, and reaching an end point, characterized in that the course generator comprises:

generating means for generating a branch course according to a cubic curve, in such a manner that:

in a case where a tangent to the scheduled course at the branch point of the scheduled course is parallel to a line segment which coincides with a traveling direction of the moving body at the end point of the branch course, one extreme of the cubic curve coincides with the branch point, while a tangent of the cubic curve at that extreme coincides with a tangent of the scheduled course at that branch point, and another extreme of the cubic curve coincides with the end point of the branch course, while a tangent to the cubic curve at that extreme coincides with a line segment coincident with the traveling direction of the moving body at the end point.

Also, as discussed above, it is a second object of the present invention to provide a course generator of a moving body which can resolve the difficulties discussed above, such as poor working efficiency resulting in the case where communication is performed randomly among moving bodies.

In order to achieve the second object, the principal invention of the second invention of the present invention provides a course generator of a moving body wherein a plurality of moving bodies are provided with transmitter/receivers and a ground monitor station is provided with a transmitter/receiver; and the ground monitor station transmits, to a plurality of moving bodies, position data relating to a scheduled course on which the plurality of moving bodies are guided and a branch course branching from the scheduled course, while the plurality of moving bodies are guided along the scheduled course and branch course branching from the scheduled course on the basis of the received position data for courses, characterized in that:

the ground monitor station is provided with guiding means for guiding the moving bodies along a modified course of the branch course;

the moving bodies are provided with modified course generating means for generating the modified course of the branch course at the time when the moving bodies are guided by the guiding means; and the ground monitor station is provided with transmitting means for re-generating, on the basis of transmitted data of modified course, the scheduled course and branch course and transmitting position data of the re-generated course to each moving body, in a case where the position data of the modified course generated by the modified course generating means of any one of the plurality of moving bodies is transmitted to the ground monitor station.

With the configuration of the first invention, as shown in FIG. 6, a branch course 52 is generated with a cubic curve in such a manner that, one extreme of the cubic curve coincides with a branch point PS, while a tangent of the cubic curve at that extreme coincides with a tangent 53 of a scheduled course 50 at the branch point PS; and another extreme of the cubic curve coincides with an end point PL of the branch course 52, while a tangent of the cubic curve at that extreme coincides with a line segment 54 coincident with a traveling direction of a moving body 20 at an end point, in the case where the tangent 53 of the scheduled course 50, at the branch point PS of the scheduled course 50, is parallel to the line segment 54 which coincides with the traveling direction of the moving body 20 at the end point PL of the branch course 52.

In this way, a branch course can for certain be generated even when the traveling direction of the moving body at the end point coincides with the direction of the tangent of the scheduled course at the branch point, and regardless of the form of a working face, the form of a scheduled course, and the azimuth and coordinate position of a loading point.

Also, with the configuration of the second invention, as shown in FIG. 1, a ground monitor station 40 effects processing to guide the moving body 20 along a modified course of the branch course.

When guided, the moving body 20 generates a modified course of the branch course. When position data of the modified course is generated in any moving body among the plurality of moving bodies and is transmitted to the ground monitor station 40, the ground monitor station 40 again generates the scheduled course and branch course on the basis of the position data of the modified course which was transmitted and transmits the position data of this re-generated course to each moving body.

In this way, the modified data of the branch course prepared in a moving body does not need to be transmitted to other moving bodies individually and may be transmitted just to the sole ground monitor station. Afterwards this ground monitor station transmits position data of the modified course to each moving body. As a result, the difficulties, such as poor working efficiency resulting when communication is performed randomly among moving bodies, can be resolved.

BEST MODE FOR CARRYING OUT THE INVENTION

The mode for carrying out the course generator of moving body is explained below through the embodiment and with reference to the figures.

Figure 8:
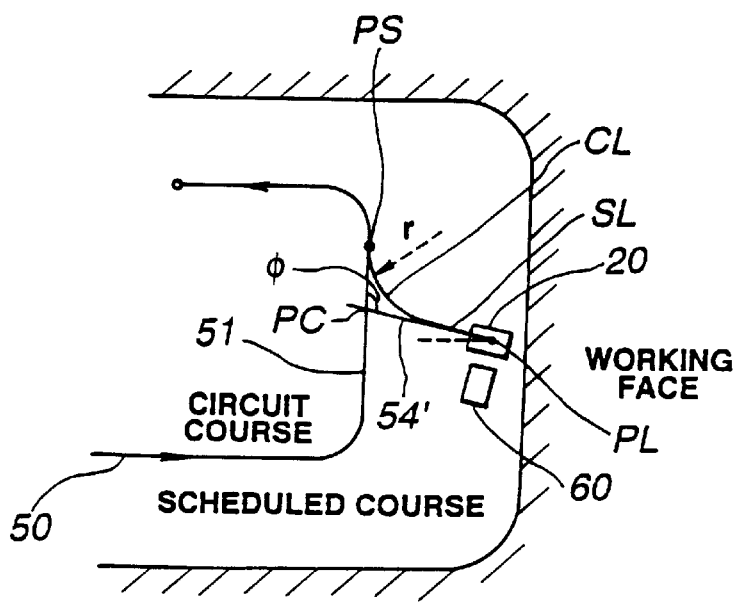
FIG. 8 is a diagram used to explain the conventional method for generating a branch course.

In this embodiment, as in the prior art shown in FIG. 8, it is assumed that the system is one where a plurality of the automated dump trucks 20, which are moving bodies, are present in a large work site; a loader 60 (loading vehicle) is present at the loading site and loads earth and sand excavated with this loader 60 into the automated dump trucks 20; and the automated dump trucks 20 transport loads, such as earth and sand, to a prescribed location. The automated dump trucks 20 are guided along a scheduled course 50 with a known method of dead reckoning.

Figure 1:
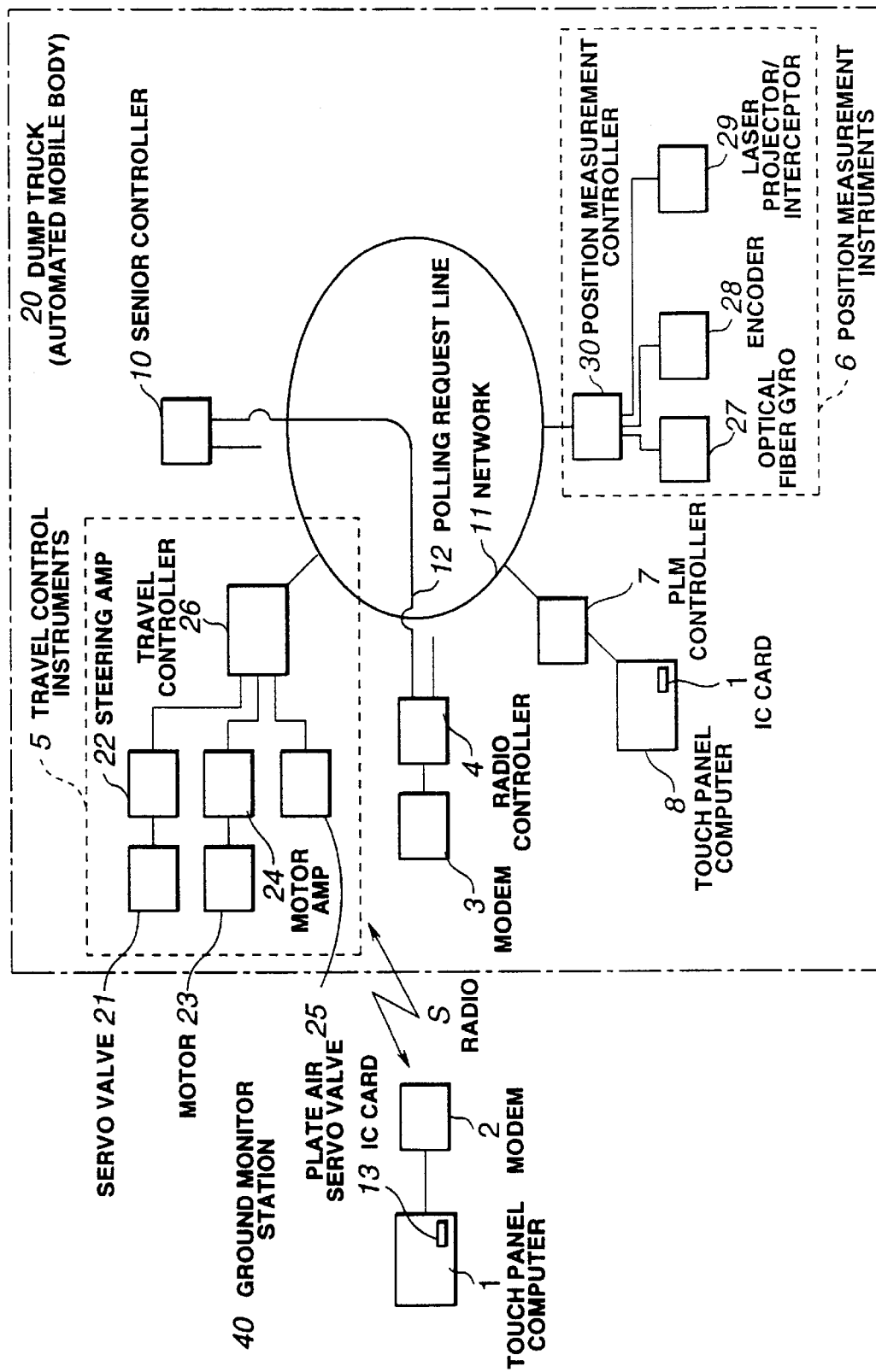
FIG. 1 is a block diagram to show an automated dump truck operating system which is an embodiment of the course generator of moving body relating to the present invention.

FIG. 1 is a block diagram showing the automated dump truck operating system, which shows a system where processing, such as transmission and reception, is effected reciprocally between the plurality of automated dump trucks 20 and the ground monitor station 40 established in a prescribed location in the work site.

In other words, as shown in FIG. 1, this system generally comprises a device installed in the ground monitor station 40 and devices installed in the plurality of dump trucks 20.

Transmission and reception of a radio signal S is effected between a modem 3, which is a wireless data transmission apparatus installed in the dump trucks 20 (below referred to as vehicles 20), and a modem 2 with the same function installed in the ground monitor station 40.

Figure 5:
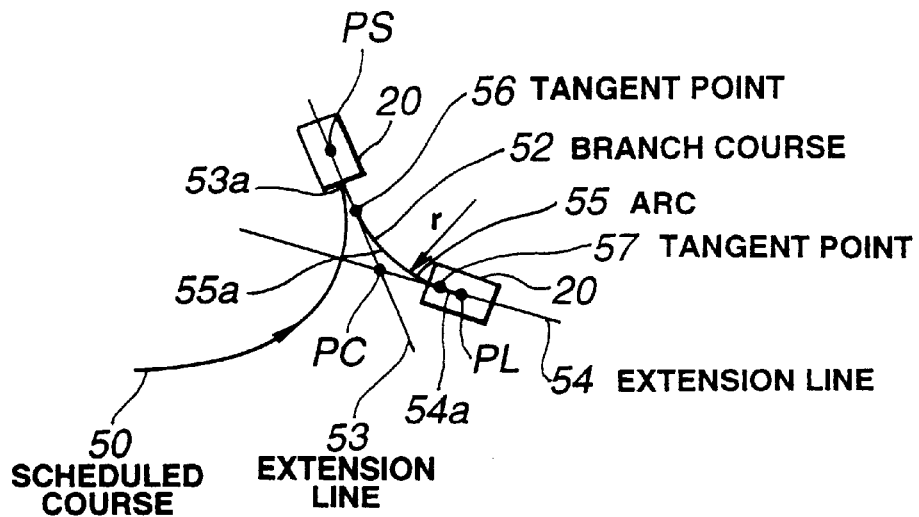
FIG. 5 is a diagram to show the geometrical relationships in the course traveled by the moving bodies and is a diagram used to explain the processing to generate a branch course.

In the case of modifying the route relating to a branch course 52 of a scheduled course 50 as shown in FIG. 5, input is made via the touch panel computer in the ground monitor station 40. As a result, the signal S to guide the vehicle 20 to the loading point PL, the endpoint to be changed of the branch course 52' to be modified, is transmitted to the vehicle 20.

As a result, the travel controller 26 guides the vehicle 20 to the loading point PL to be changed. The serial positions and directions of the path traveled by the vehicle 20 at this time are measured with the position measurement controller 30. The coordinate position and azimuth data of the loading point PL to be changed are sent to the touch panel computer 8. Then the touch panel computer 8 generates a modified branch course 52', on the basis of the coordinate position and azimuth data of the changed loading point PL which were sent, and stores this generated course data in an IC card 9. As a result, it then becomes possible to guide the guided vehicle 20 with dead reckoning along the modified branch course 52' newly stored in the IC card 9.

Also, a radio controller 4 transmits course data for the modified branch course 52' to the ground monitor station 40. The touch panel computer 8 in the ground monitor station 40 effects new processing to again generate the course data D for the scheduled course 50 and the branch course 52 on the basis of the course data for the modified branch course 52' which was transmitted. This newly re-generated course data D' for the scheduled course 50 and the branch course 52' is transmitted as a radio signal S to each of the other vehicles 20, excluding the aforementioned guided vehicle 20.

As a result the position data of the modified branch course 52' is stored in the IC cards 9 installed in the vehicles 20, excluding the vehicle 20 which was guided along the modified branch course 52'. As a result, it then becomes possible to guide all vehicles 20 traveling through the work site with dead reckoning along the scheduled course 50 and modified branch course 52' newly stored in the IC cards 9.

Below the details noted above are explained with reference to the flow chart in FIG. 2.

In the vehicle 20, it is determined whether guidance instructions have been input from the ground monitor station 40 (Step 101, 102). When guidance instructions were not input, other processing is executed in the vehicle 20 (Step 103). When guidance instructions were input, it is determined whether the vehicle 20 which received these instructions is present at the entry (working face entry: entry to loading point PL shown in FIG. 5) to the loading area (Step 104). When the vehicle 20 is not at the loading entrance, it is determined that guidance to the loading point PL (FIG. 5) is not possible and a message indicating "Guidance impossible" is returned to the ground monitor station 40 (Step 105).

Meanwhile, when it is determined that guidance is possible (YES in Step 104), the monitor screen of the touch panel computer 1 switches to a guidance screen for providing appropriate guidance instructions to the vehicle 20 (Step 106).

Then. instructions to start toward the loading point PL to be changed are output to the vehicle 20. The vehicle 20 receives these instructions and starts from the branch point PS on the scheduled course 50 as shown in FIG. 5 (Step 107).

Afterwards the ground monitor station 40 sequentially outputs guidance instructions, "move by a particular amount in either left-right or forward-backward direction", to the vehicle 20. The vehicle 20 receiving these instructions moves in sequence by the distances and in the directions according to the instructions input (Steps 108, 109, 110). These guidance instructions are output continuously until the vehicle 20 arrives at the loading site (loading point PL) which was changed (Step 111).

When the vehicle 20 arrives at the loading point PL in due course (YES in Step 111), the vehicle 20 generates course data to show the path (series of coordinate points) of the modified branch course 52', as discussed below, on the basis of data of the coordinate position and traveling direction at the branch point PS on the scheduled course 50 from which the vehicle started and data of the coordinate position and traveling direction at the loading point PL at which the vehicle arrived.

The ground monitor station 40 waits for the generation of the course data of this modified branch course 52' to finish. When the vehicle 20 transmits a message of "generation complete" to the ground monitor station 40 and that message is displayed on the monitor screen of the touch panel computer 1 (Step 112, YES in Step 113), the course data of the modified branch course 52' is transferred from the vehicle 20 to the ground monitor station 40 (Step 114).

When this transmission processing of course data for the modified branch course 52' is finished (YES in Step 115), processing to again generate all courses including the scheduled course 50 in consideration of the modified branch course 52' is executed in the touch panel computer 1 (Step 116). Then, as discussed above, the aforementioned re-generated course data D' for the scheduled course 50 and modified branch course 52' is transmitted to other vehicles 20 which travel in the work site.

In this case, it is desirable that the altered course data D' be transferred at the time when another vehicle 20 arrives at the loading entry (branch point PS in FIG. 5).

Moreover, the vehicle 20, which was initially guided to the changed loading point PL, itself generates the modified branch course 52'; therefore it is not necessary that the ground monitor station 40 transmit the modified course data D' in advance.

Figure 2:
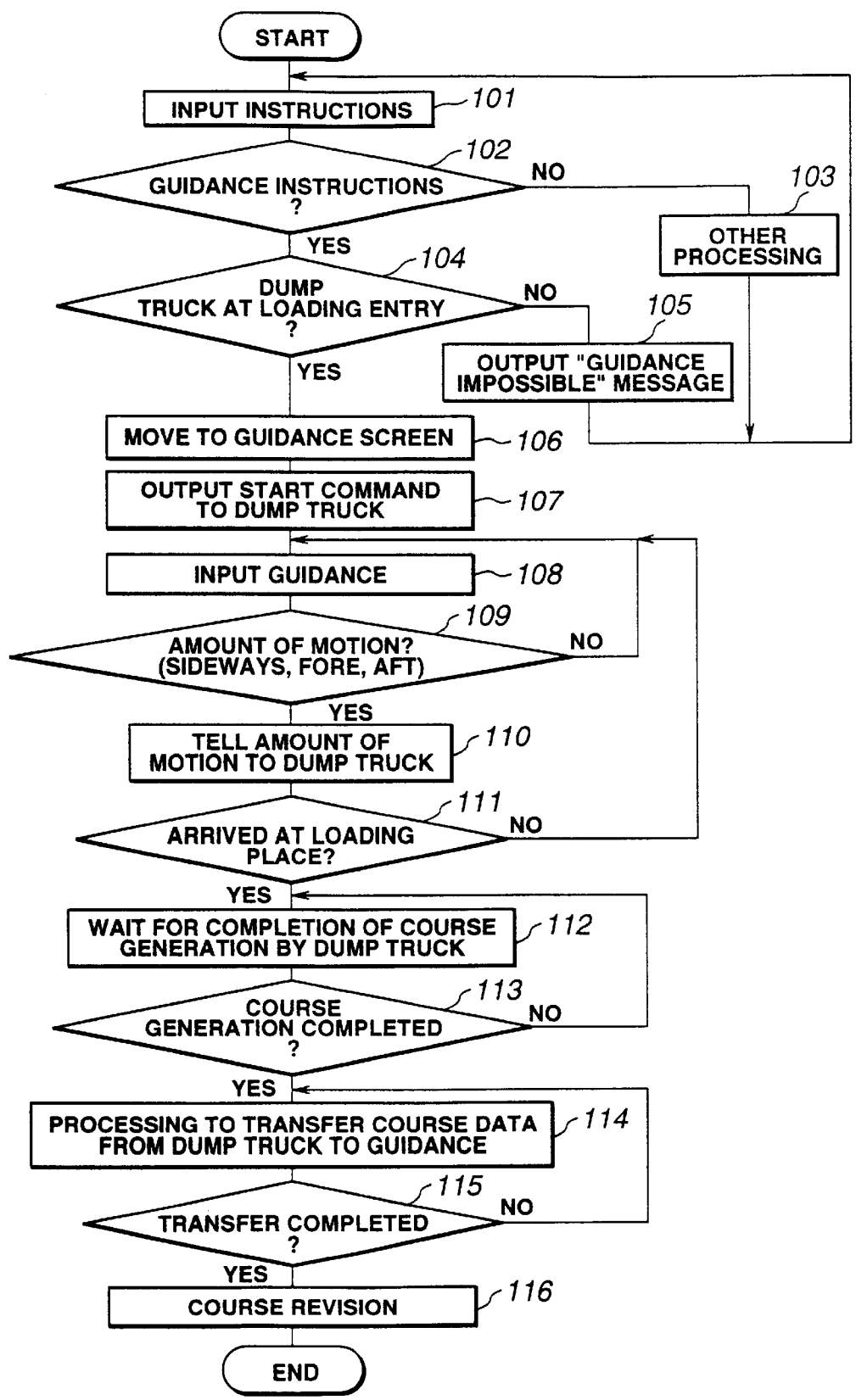
FIG. 2 is a flow chart to show the processing procedures executed in the system shown in FIG. 1.

As above, with the embodiment shown in FIG. 2, it is not necessary that the vehicle 20 transmit the modified data for the branch course generated to other vehicles individually and need only transmit this to the single ground monitor station 40; afterwards this ground monitor station 40 transmits the modified course data to the other vehicles. As a result the difficulties, such as poor working efficiency resulting in the case where communication is performed randomly among the vehicles 20, can be resolved.

Moreover the embodiment shown in FIG. 2 has the marked effects discussed above, but it still has points which need improvement, for example its working efficiency is reduced by the time necessary for transferring the modified course data to the ground monitor station 40; this transfer is required because the touch panel computer 8 loaded on the vehicle 20 generates the modified course 52'.

For this reason, an embodiment which can improve this point is explained with reference to the flow chart in FIG. 3.

In this embodiment, the processing to generate a modified course, which was performed in the vehicle 20, is here executed in the ground monitor station 40.

Figure 3:
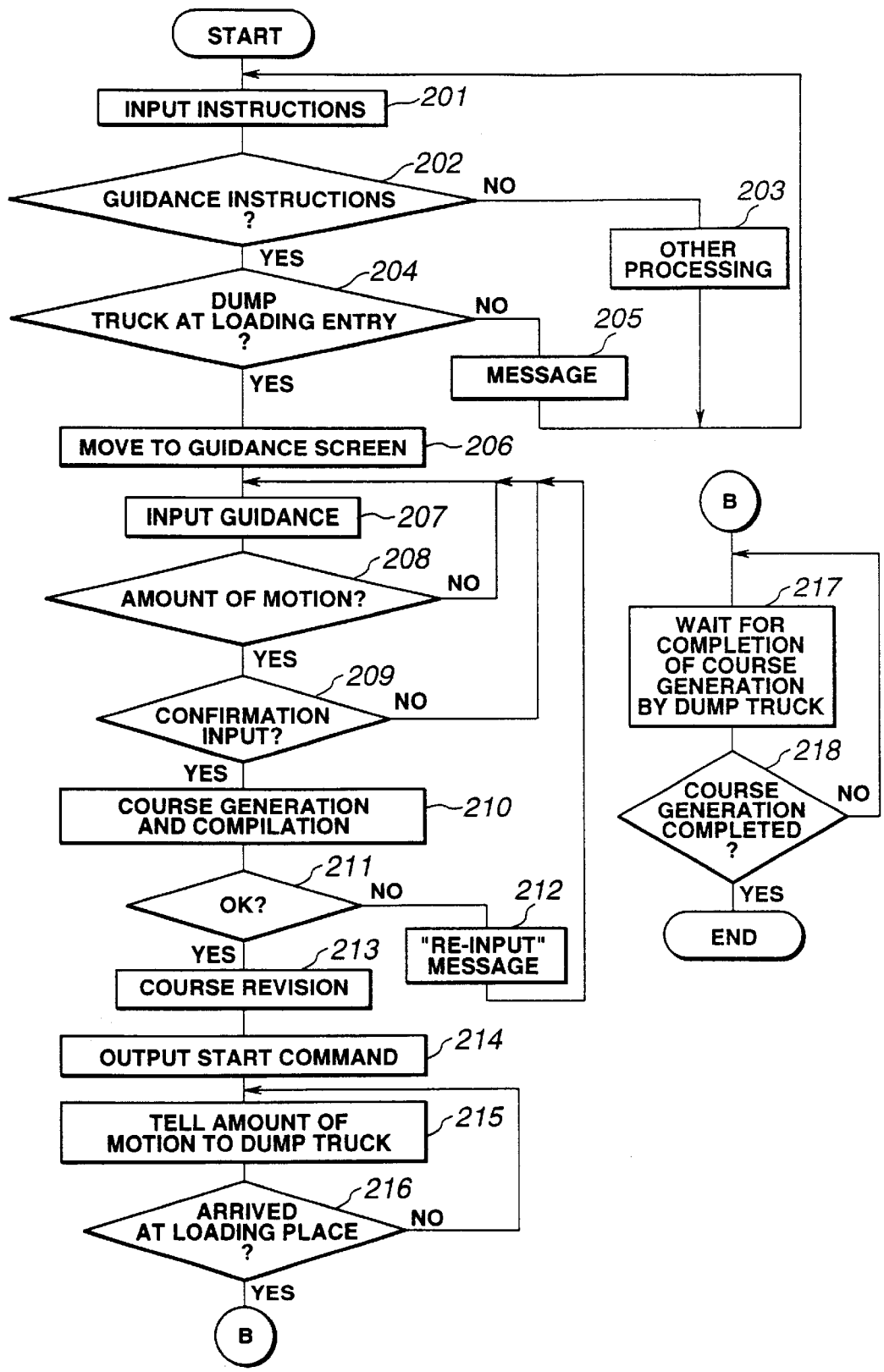
FIG. 3 is a flow chart to show the processing procedures executed in the system shown in FIG. 1.

In other words, the same processing as in Steps 101–106 in FIG. 2 is executed in Steps 201–206 as shown in FIG. 3.

Next in Steps 207–209, the same algorithm as in Steps 107–111 in FIG. 2 is executed as a process internal to the touch panel computer 1 without actually guiding the vehicle 20.

Specifically the vehicle 20 on the monitor screen is guided to the loading point PL to be changed; at the time when a confirmation of having arrived at the loading point PL is input (YES in Step 209), the ground monitor station 40 generates and compiles course data to show the path (sequence of coordinate points) of the modified branch course 52' as discussed below, on the basis of data of the coordinate position and traveling direction at the branch point PS on the scheduled course 50 from which the vehicle started and data of the coordinate position and traveling direction at the loading point PL at which the vehicle arrived (Step 210).

It is determined whether the path of this modified branch course 52' is valid in relation to the environment, etc., of the actual work site (Step 211). When the modified branch course 52' is not valid, a message requesting "re-input" is displayed on the monitor screen (Step 212); the procedure returns to Step 207 and processing is executed which "guides" the vehicle 20 on the monitor screen once more to another valid loading point PL.

However, when it is determined that the modified branch course 52' is valid, processing to again generate all courses including the scheduled course 50 in consideration of the modified branch course 52' is executed in the touch panel computer 1 (Step 213).

Then this time, the processing to guide the vehicle 20 present at the loading entry (branch point PS) to the aforementioned changed loading point PL is actually executed in Steps 214–216 in the same way as in Steps 107–111 in FIG. 1.

Then, the ground monitor station 40 waits for the completion of the processing to generate course data for the modified branch course 52' performed in the vehicle 20. When the vehicle 20 transmits a message of "generation complete" to the ground monitor station 40 and that message is displayed on the monitor screen of the touch panel computer 1 (Step 217, YES in Step 218), the processing is entirely complete.

Afterwards the aforementioned course data D' for the re-generated scheduled course 50 and the modified branch course 52' is transmitted to the other vehicles 20 traveling through the work site as discussed above.

In this case, it is desirable that the altered course data D' be transferred at the time when another vehicle 20 arrives at the loading entry (branch point PS in FIG. 5).

Moreover, the vehicle 20, which was initially guided to the changed loading point PL in Steps 214–216, itself generates the modified branch course 52'; therefore it is not necessary that the ground monitor station 40 transmit the modified course data D' in advance.

As above, with the embodiment shown in FIG. 3 as in the embodiment shown in FIG. 2, it is not necessary that the vehicle 20 transmit the modified data for the branch course generated to other vehicles individually; this ground monitor station 40 transmits the modified course data to the other vehicles. As a result the difficulties, such as poor working efficiency resulting in the case where communication is performed randomly among the vehicles 20, can be resolved.

Furthermore, with the embodiment shown in FIG. 3, the touch panel computer 1 of the ground monitor station 40 generates the modified course and therefore the transfer of modified course data from the vehicle 20 to the ground monitor station 40 is unnecessary. For this reason, another advantage is the effect that working efficiency is improved by the time necessary for that transfer.

Next the method for generating the branch course 52 (the aforementioned modified branch course 52') is explained with reference to the flow chart in FIG. 4 and FIGS. 5–7 showing geometrical relationships of the courses. Moreover the embodiment shown below may be carried out in combination with the embodiments shown in FIGS. 2 and 3 or it may be carried out independently.

The method for generating a branch course shown in FIG. 5 is explained.

This method for generating a branch course shown in FIG. 5 is the method applied in the case where the tangent 53 of the scheduled course 50 at the branch point PS of a scheduled course 50 is not parallel to a line segment 54 which coincides with the traveling direction of the moving body 20 at the end point PL of the branch course 52 (in effect, there is a crossing point PC), and when the crossing point of the branch point tangent 53 at the branch point PS with the end point line segment 54 at the end point PL of the branch course 52 is located between the branch point PS and the end point PL, and a radius r of an arc 55 is greater than the minimum necessary turning radius for the vehicle 20 (in effect the case where the radius r of the arc 55 is greater than a certain size).

Figure 4:
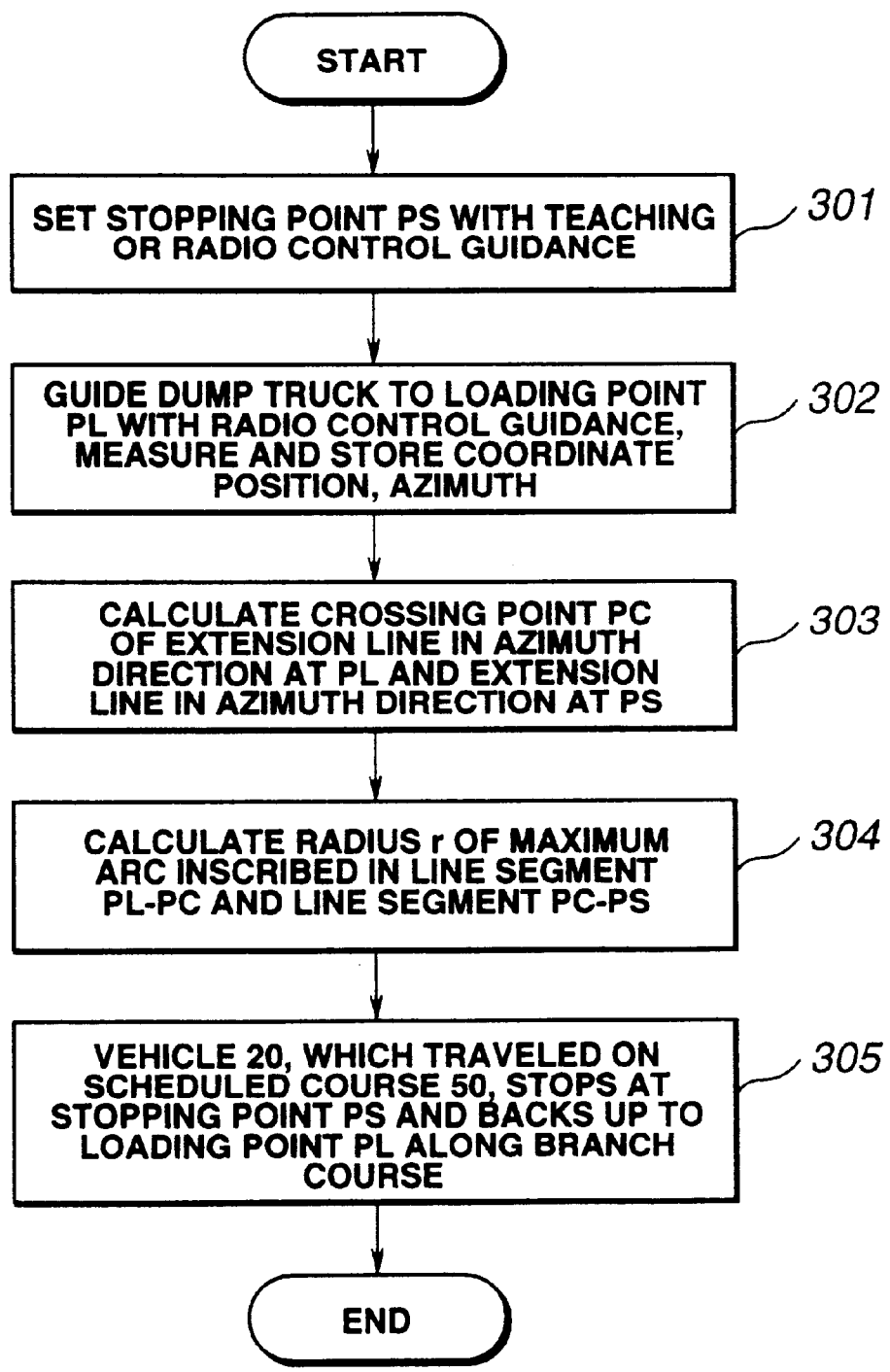
FIG. 4 is a flow chart to show the procedures for the processing to generate a branch course.

Specifically, as shown in Step 301 in FIG. 4, the vehicle 20 is guided by a teaching machine or radio controlled guidance to a branch point PS where the branch course 52 branches from the scheduled course 50; the vehicle 20 is stopped at this point and determines and stores the coordinate position and direction (azimuth) of that branch point PS (Step 301).

Next the vehicle 20 through radio controlled guidance is guided to the loading point PL, which is the end point of the branch course 52, and measures and stores the coordinate position and direction at that loading point PL (Step 302).

Then the coordinate position of the crossing point PC of an extension line 53 (in effect the tangent 53 of the scheduled course 50 at the branch point PS), coincident with the direction (azimuth) of the vehicle 20 at the branch point PS stored in Step 301, and an extension line 54, coincident with the direction (azimuth) of the vehicle 20 at the loading point PL stored in Step 302, is calculated (Step 303).

The radius r of the arc 55, inscribed in both the line segment connecting point PS and point PC and the line segment connecting point PC and point PL, is found through calculation on the basis of the coordinate position data of each point PS, PL, PC attained in Steps 301–303 (Step 304).

When the arc 55 is found in this way, a path 53a (sequence of coordinate points), from a branch point PS on the extension line 53 to a point 56 on the arc 55 inscribed in the extension line 53, is found. Then a path 55a (sequence of coordinate points), from a point 56 on the arc 55 inscribed in the extension line 53 to a point 57 inscribed on the extension line 54, is found. Furthermore a path 54a (sequence of coordinate points), from a point 57 on the arc inscribed in the extension line 54 to the loading point PL, is found. The path connecting these paths 53a, 55a, and 54a is the branch course 52.

As a result, the vehicle 20 travels independently through dead reckoning on the basis of course data (position data) of the generated branch course 52.

Specifically the vehicle 20 travels on the scheduled course as shown by the arrow, stops at the branch point PS, and then backs up to the loading point PL along the branch course 52 comprising the aforementioned paths 53a, 55a, 54a (Step 305).

Figure 6:
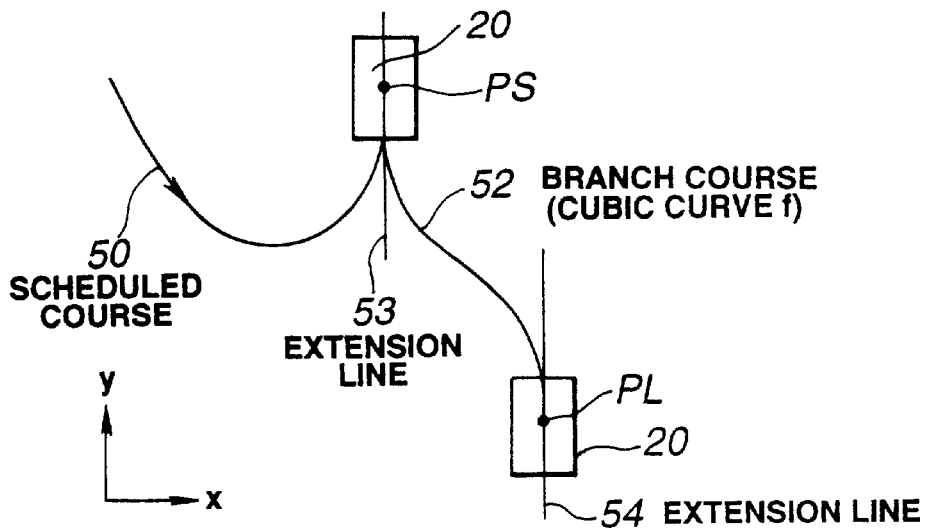
FIG. 6 is a diagram to show the geometrical relationships in the course traveled by the moving bodies and is a diagram used to explain the processing to generate a branch course.

The branch course 52 is generated as shown in FIG. 6 when the two extension lines 53 and 54 do not have a crossing point PC, in effect when the extension line 53 is parallel to the extension line 54 in Step 303.

In this case as well the same type of processing as in Steps 301 and 302, of the processing in FIG. 4, is executed; data regarding the coordinate position and direction at the branch point PS and data regarding the coordinate position and direction at the loading point PL are stored.

The subsequent processing is effected as follows.

Specifically the branch course 52 is set to be the cubic curve f: y=ax3+bx2+cx+d (x-y coordinates).

Thus the unknown quantities a, b, c, and d of the cubic curve f are determined on the basis of the following conditions.

(1) One extreme of the cubic curve f coincides with the branch point PS.

(2) The tangent to the cubic curve f at the extreme in (1) coincides with the tangent (extension line 53) to the scheduled course 53 at the branch point PS.

(3) The other extreme of the cubic curve f coincides with the loading point PL.

(4) The tangent to the cubic curve f at the extreme in (3) coincides with the line segment (extension line 54) coincident with the direction (azimuth) of the vehicle 20 at the loading point PL.

The branch course 52 (sequence of coordinate points) is generated by this cubic curve f.

Afterwards as shown in Step 305 above, the vehicle 20 travels independently through dead reckoning on the basis of the course data for the generated branch course 52.

Figure 7:
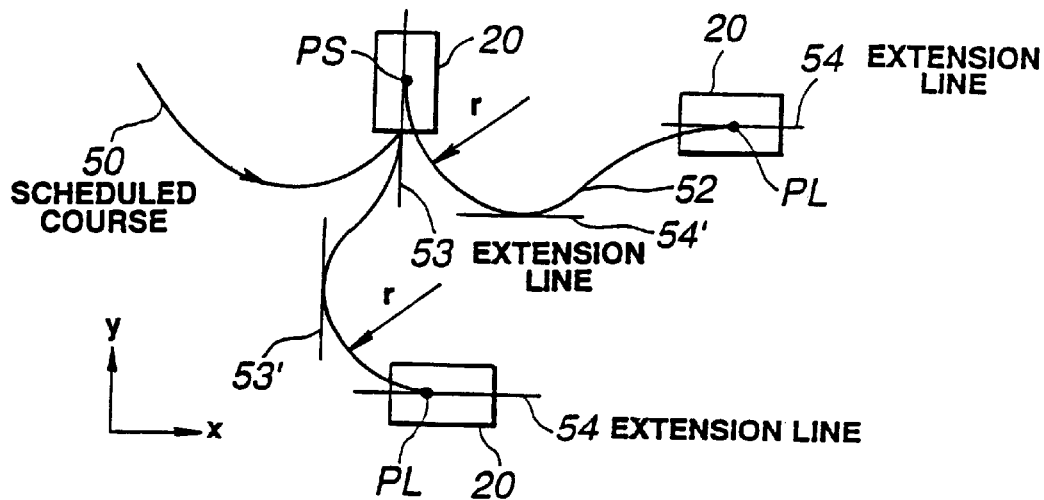
FIG. 7 is a diagram to show the geometrical relationships in the course traveled by the moving bodies and is a diagram used to explain the processing to generate a branch course.

In Step 304 above, the branch course 52 is generated as shown in FIG. 7 when the radius r of the arc 55 is less than a prescribed value (minimum turning radius of the vehicle 20). Even when the radius r of the arc 55 is greater than the aforementioned prescribed value, the branch course 52 is generated as shown in FIG. 7 in the case where the crossing point of the branch point tangent 53 at the branch point PS with the end point line segment 54 at the end point PL of the branch course 52 is not located between the branch point PS and the end point PL.

In this case as well the same type of processing as in Steps 301 and 302, of the processing in FIG. 4, is executed; data regarding the coordinate position and direction at the branch point PS and data regarding the coordinate position and direction at the loading point PL are stored.

The subsequent processing is effected as follows.

Specifically the branch course 52 is set as shown in FIG. 7 to be a combination of the cubic curve f:y=ax3+bx2+cx+d (x-y coordinates) with the arc of the radius r which is greater than the minimum turning radius of the vehicle 20.

Thus the unknown quantities a, b, c, and d of the cubic curve f are determined on the basis of the following conditions.

(1) One extreme of the cubic curve f coincides with the branch point PS.

(2) The tangent to the cubic curve f at the extreme in (1) coincides with the tangent (extension line 53) to the scheduled course 53 at the branch point PS.

(3) The cubic curve f is a smooth continuation of the arc r.

(4) At the loading point PL, the arc r in (3) above contacts the line segment (extension line 54) coincident with the traveling direction of the vehicle at that point PL.

Or it may be as follows.

The unknown quantities a, b, c, and d of the cubic curve f are determined on the basis of the following conditions.

(1) One extreme of the cubic curve f coincides with the loading point PL.

(2) The tangent to the cubic curve f at the extreme in (1) coincides with the line segment (extension line 54) coincident with the traveling direction of the vehicle at the loading point PL.

(3) The cubic curve f is a smooth continuation of the arc r.

(4) At the loading point PS, the arc r in (3) above contacts the tangent (extension line 53) to the scheduled course 50 at that branch point PS.

The branch course 52 (sequence of coordinate points) is generated according to this cubic curve f and the arc r.

Moreover the following method is considered to be the way to effect a continuous connection of the cubic curve f and arc r in (3) above.

(3)' When one extreme of the cubic curve f coincides with the branch point PS, a line segment 53' parallel to the extension line 53, which is tangent at this branch point, is established. The arc r contacts this line segment 53'. The contact of this arc r coincides with the other extreme of the cubic curve f; the tangent of the cubic curve f at that extreme coincides with the line segment 53'.

Or (3)' When one extreme of the cubic curve f coincides with the loading point PL, a line segment 54' parallel to the line (extension line 54) of the traveling direction of the vehicle at this loading point PL is established. The arc r contacts this line segment 54'. The contact of this arc r coincides with the other extreme of the cubic curve f; the tangent of the cubic curve f at that extreme coincides with the line segment 54'.

Afterwards as shown in Step 305, the vehicle 20 travels independently through dead reckoning on the basis of course data of the generated branch course 52.

As discussed above, the embodiments shown in FIGS. 4–7 can generate for certain a branch course 52 and greatly improve the reliability of the course generator, regardless of the form of a working face, the form of a scheduled course (for example, even if it is not a long, straight path parallel to the working face), and the azimuth and coordinate position of a loading point PL.

As explained above, the first invention of the present invention can generate for certain a branch course regardless of the form of a working face, the form of a scheduled course, and the azimuth and coordinate position of a loading point; therefore it can greatly improve the reliability of the course generator.

Also, the second invention of the present invention greatly improves difficulties such as poor working efficiency resulting in the case where communication is performed randomly among moving bodies.

INDUSTRIAL APPLICABILITY

The present invention is applied mainly to automated dump trucks traveling in a large, outdoor work site, but can also be applied to automated transport vehicles, etc., traveling indoors.

What is claimed is:

1. A course generator for moving bodies in which a plurality of moving bodies are provided with communication equipment, a ground monitor station is provided with communication equipment; the ground monitor station transmits, to the plurality of moving bodies, position data of a course on which the plurality of moving bodies are guided to an arrival point through which the plurality of moving bodies are guided along the course on the basis of the received position data of the course comprising:

modified course generating means for modifying one of an entire course and a part ofthe course in accordance with the arrival point of a moving body to thereby generate modified course position data, and the ground monitor station includes means for transmitting the modified course position data of the modified course generated by the modified course generating means to the plurality of moving bodies.

2. The course generating means as defined in claim 1 wherein the ground monitor station further includes display means for displaying the modified course data.

3. The course generating means as defined in claim 1 including a plurality of calculating means associated with each of said modified course data generating means for performing calculations to generate the modified course data between a first point and a second point, and means for selecting one of the plurality of calculating means in accordance with the relative distance and a relative angle between the first and second points.

* * * * *